US008824282B2

(12) United States Patent
Singh et al.

(10) Patent No.: US 8,824,282 B2
(45) Date of Patent: Sep. 2, 2014

(54) NETWORK SIMULATION AND ANALYSIS USING OPERATIONAL FORWARDING DATA

(75) Inventors: Pradeep Singh, Arlington, VA (US); Vinod Jeyachandran, Rockville, MD (US); Yu Lin, Centreville, VA (US)

(73) Assignee: Riverbed Technology, Inc., San Francisco, CA (US)

( * ) Notice: Subject to any disclaimer, the term of this patent is extended or adjusted under 35 U.S.C. 154(b) by 1046 days.

(21) Appl. No.: 11/838,417

(22) Filed: Aug. 14, 2007

(65) Prior Publication Data

US 2008/0043627 A1 Feb. 21, 2008

Related U.S. Application Data

(60) Provisional application No. 60/822,400, filed on Aug. 15, 2006.

(51) Int. Cl.
*H04L 12/28* (2006.01)
*H04W 24/06* (2009.01)
*H04W 16/22* (2009.01)
*H04W 40/02* (2009.01)

(52) U.S. Cl.
CPC .............. *H04W 24/06* (2013.01); *H04W 16/22* (2013.01); *H04W 40/02* (2013.01)
USPC .......................................... 370/230; 370/351

(58) Field of Classification Search
CPC ...... H04W 24/06; H04W 16/22; H04W 40/02
USPC ......... 370/241, 257, 230, 254–256, 351, 431; 715/736; 709/224
See application file for complete search history.

(56) References Cited

U.S. PATENT DOCUMENTS

| | | | |
|---|---|---|---|
| 5,579,307 A | 11/1996 | Richetta et al. | |
| 5,907,696 A * | 5/1999 | Stilwell et al. | 703/13 |
| 6,014,697 A * | 1/2000 | Lewis et al. | 709/223 |
| 6,442,141 B1 | 8/2002 | Borella et al. | |
| 6,883,034 B1 | 4/2005 | Pelavin et al. | |
| 7,200,545 B2 * | 4/2007 | Lines et al. | 703/21 |
| 7,254,524 B1 * | 8/2007 | Richey et al. | 703/22 |
| 7,447,921 B2 * | 11/2008 | Joo et al. | 713/300 |
| 7,464,014 B2 * | 12/2008 | Nace et al. | 703/13 |
| 2001/0011215 A1 * | 8/2001 | Beeker et al. | 703/27 |
| 2002/0178246 A1 | 11/2002 | Mayer | |
| 2003/0125924 A1 * | 7/2003 | Lines et al. | 703/20 |
| 2004/0122645 A1 * | 6/2004 | Shevenell et al. | 703/21 |
| 2007/0171834 A1 * | 7/2007 | Sathyanarayana et al. | 370/241 |
| 2007/0199052 A1 * | 8/2007 | Sankaran et al. | 726/4 |

* cited by examiner

*Primary Examiner* — Nizar Sivji
(74) *Attorney, Agent, or Firm* — Coats & Bennett, PLLC

(57) ABSTRACT

A hybrid approach to populating forwarding tables in a virtual network obtains forwarding data both by simulating routing protocol behavior in the virtual network to build forwarding tables, and by importing operational forwarding data from corresponding physical nodes in a physical network. The use of operational forwarding data improves the fidelity of the simulation by closely conforming forwarding behavior in the simulation to that which occurs in the physical network.

23 Claims, 2 Drawing Sheets

NETWORK SIMULATION AND ANALYSIS USING OPERATIONAL FORWARDING DATA

This application claims priority to U.S. Provisional Application Ser. No. 60/822,400, filed Aug. 15, 2006, and incorporated herein by reference in its entirety.

BACKGROUND

Networks, such as telecommunication networks, data transfer networks (including the Internet), and the like, are ubiquitous and increasingly relied upon in conducting a wide variety of activities. Businesses that maintain and operate these networks need to accurately analyze network operation, and need tools to plan for network growth. The ability to abstract the network into a virtual network environment such as a database, simulate traffic flows through the network, and analyze many aspects of the network's operation, allows network administrators to optimize existing networks, plan for future growth, increase reliability by simulating network failures, analyze network security, and ensure conformance with organizational policies and other rules regarding network operation.

Conventional network simulation includes creating a virtual network and simulating traffic flows through the virtual network according to predetermined routing protocols, to populate the virtual network nodes with routing and forwarding information such as forwarding tables. A virtual network is a data structure comprising virtual features (nodes and links) that represent corresponding features in a physical network. The physical network features may exist in an actual network, or, in the case of "what if" simulations such as planning for network growth, the virtual network may include virtual features that do not have an existing counterpart in an actual network. In either case, traffic flows may be simulated through the virtual network, and the simulated behavior monitored and analyzed.

To achieve high fidelity simulations, wherein simulated traffic behavior closely matches traffic behavior on an actual, physical network, the routing and forwarding information generated through the simulation should closely match that maintained at corresponding nodes in the physical network. However, if the virtual network is incomplete with respect to topology or configuration, the simulation may not have enough data to create accurate forwarding tables. Additionally, equipment vendors often create protocol behaviors that are not described in the standards for a particular protocol, in response to requests from their customers, or to differentiate their products in the marketplace. These deviations from the standard protocol may not be reflected in the simulation, which models the standards. Accordingly, the forwarding tables generated through the simulation may differ significantly from those that are created in the actual, physical network.

SUMMARY

According to one or more embodiments disclosed and claimed herein, a hybrid approach to populating forwarding tables in a virtual network obtains forwarding data both by simulating routing protocol behavior in the virtual network to build forwarding tables, and by importing operational forwarding data from corresponding physical nodes in a physical network. The use of operational forwarding data improves the fidelity of the simulation by closely conforming forwarding behavior in the simulation to that which occurs in the physical network.

One embodiment relates to a method of network analysis. A virtual network environment is provided, at least part of which represents physical network features. Operational forwarding data is obtained from one or more physical network nodes, and the operational forwarding data is applied to corresponding virtual network nodes. For one or more virtual network nodes, forwarding data is computed by simulating routing protocol behavior in the virtual network environment.

Another embodiment relates to a computer readable medium including one or more computer programs operative to cause a computer to perform network analysis. The computer programs are operative to cause the computer to perform the steps of providing a virtual network environment, at least part of which represents physical network features; obtaining operational forwarding data from one or more physical network nodes, and applying the operational forwarding data to corresponding virtual network nodes; and for one or more virtual network nodes, computing forwarding data by simulating routing protocol behavior in the virtual network environment.

DETAILED DESCRIPTION

Figure 1:
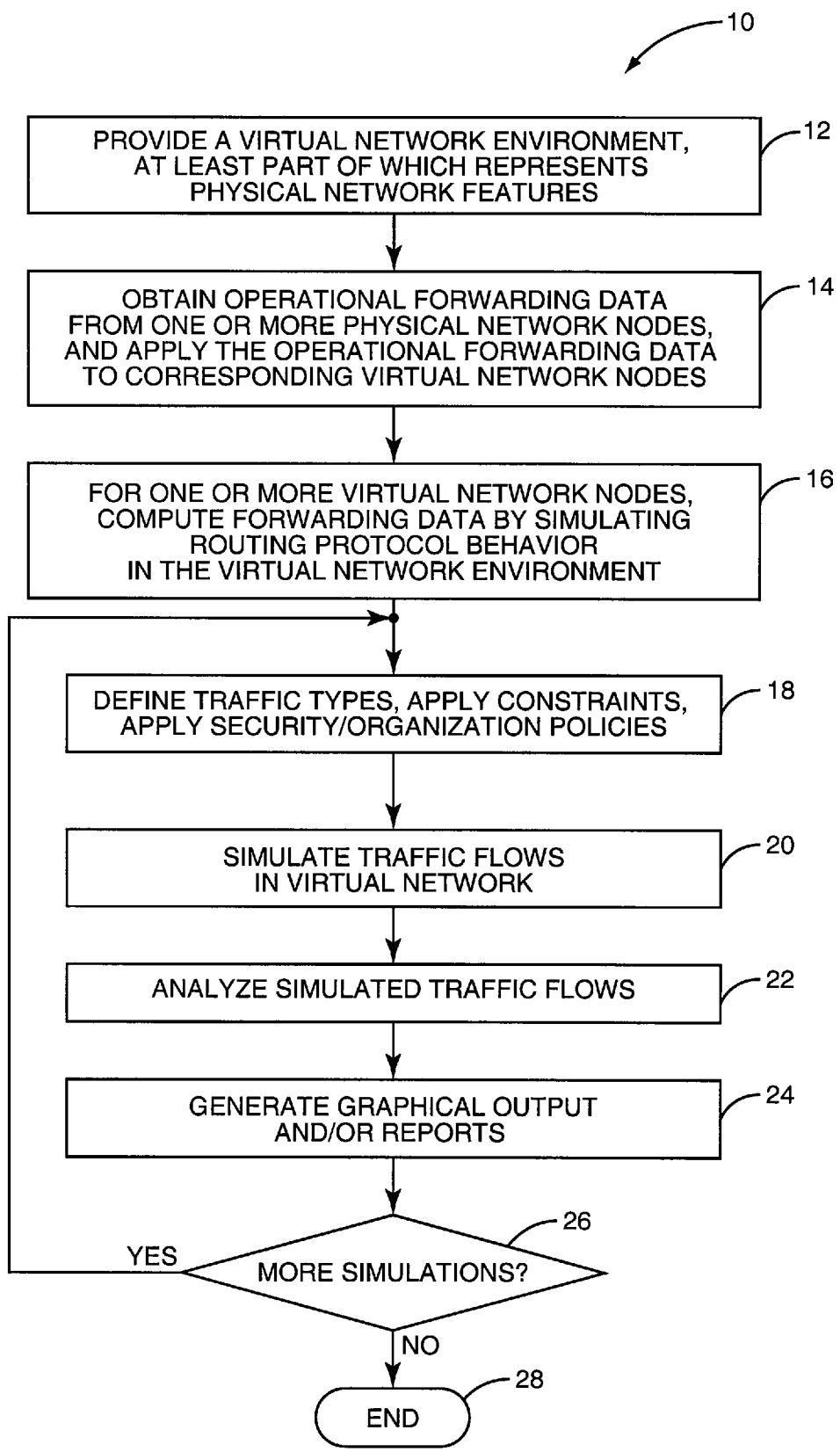
FIG. 1 is a flow diagram of a method of network analysis.

Network routing is the process of selecting paths in a network along which to send traffic, such as data packets in an IP network. For small networks, routing may be performed manually, by constructing routing tables prior to applying traffic to the network. Larger networks utilize dynamic routing, wherein routing tables are constructed automatically according to a routing protocol. Known routing algorithms include Distance Vector, Link-state, and Path Vector. Several well-defined routing protocols are known, such as the Link-state protocol Open Shortest Path First (OSPF), which uses Dijkstra's algorithm to calculate the shortest path tree inside each network area.

Dynamic routing protocols dynamically construct routing tables during a network learning process. The routing tables, maintained at network router nodes, include routes through the network to network destinations, which may be stored, for example, as network addresses (e.g., IP addresses). The routing tables may also include metrics associated with the routes, which may include bandwidth, delay, hop count, path cost, load, Maximum Transmission Unit (MTU), reliability, cost, and the like. Depending on the routing protocol, the routing table includes the entire network topology (link-state) or partial topology, such as the shortest paths to known destinations via all of its neighbors (distance vector).

Forwarding is the relaying of datagrams (such as IP packets) from one network segment to another by nodes in the network. Network nodes such as routers, bridges, gateways, firewalls, switches, and the like, forward packets by inspecting the packet header for a destination address, and looking up the destination address in a forwarding table. A forwarding table is a subset of a routing table, and includes the mapping of a next-hop address and an output interface to each destination network address (such as an IP address). The forwarding table thus tells each node which output interface to forward any packet towards. Forwarding tables are built at each node during a learning process that is independent of the forwarding process, by applying the routing protocol.

Forwarding tables are conventionally constructed in virtual networks by simulating the network learning process, and building forwarding tables at each network node prior to simulating traffic flow through the network. As discussed above, due to non-standard routing behavior, imperfect network topology or other information, or other factors, forwarding tables constructed by network simulation may not match the operational forwarding data maintained at actual, physical network nodes. As used herein, the term "operational forwarding data" refers to actual, real-world forwarding data constructed and maintained at physical nodes in an actual, physical network.

According to one or more embodiments of the present invention, operational forwarding data are extracted from a physical network and applied to corresponding virtual nodes in a virtual network for network simulation and analysis. The operational forwarding data may be obtained in several ways. In one embodiment, shell commands extract the forwarding table from each node in a physical network. In another embodiment, a user issues commands to a physical network node to export the forwarding table. This might yield a forwarding table including only the best path data. In yet another embodiment, a user issues a "data dump" command to obtain all forwarding information from a physical node, including secondary, tertiary, etc., path data. In this case, the user may extract a forwarding table from the resulting data via subsequent analysis.

Regardless of how the operational forwarding data is obtained, in one embodiment the operational forwarding data may be filtered to reduce the forwarding table size and obtain only data that is necessary for particular simulation purposes. For example, a service provider network node may include over 200,000 entries in a forwarding table. If a simulation will involve only a known set of address prefixes, the operational forwarding data may be filtered to remove the irrelevant entries.

Operational forwarding data may not always be available. For example, a particular physical network node may not report operational data, a user may lack administrator privilege or permission to obtain the data, or the like. In this case, according to one embodiment, operational forwarding data is obtained and applied to all virtual network nodes corresponding to the physical network nodes from which sufficient operational forwarding data is available. For other virtual network nodes, including those for which a corresponding physical network node does not exist, forwarding tables may be built conventionally, by simulating routing behavior in the virtual network. In one embodiment, partial operational forwarding data at a particular virtual network node may be supplemented by further building the forwarding table during simulation.

Once forwarding tables are obtained for all virtual network nodes, whether by obtaining and applying operational forwarding data or by simulating a routing protocol in the virtual network, a variety of simulations and analyses may be performed on the virtual network with the significant benefit of high simulation fidelity, with virtual network nodes more precisely simulating the behavior of physical network nodes due to the use of operational forwarding data.

One type of analysis is traffic and capacity analysis. There is constant growth in the network capacity requirements of most physical networks due to a combination of increased number of users of existing applications and the addition of new applications. A simulation may apply and analyze network traffic based on the model protocol behavior for a variety of types of traffic. For example, traffic having different burst characteristics or Quality of Service (QoS) constraints may be simulated to ascertain the network load, response, and the like. By using operational forwarding data, a more accurate traffic and capacity analysis is obtained.

Another type of analysis is security analysis, wherein various security policies may be applied to simulated network traffic, and the behavior of the security policies tested and validated. For example, the simulation and analysis may verify that certain traffic is blocked, and other traffic passes through the network. By using operational forwarding data, network managers may ensure that non-standard routing protocol behavior in network nodes does not thwart security policies.

A particularly powerful tool for understanding network traffic behavior is graphic visualization. According to one embodiment, a graphical representation of the network may be output to a display screen, printer, plotter, or the like. The screen display may be zoomed and panned, as known in the art. Based on network traffic simulations utilizing operational forwarding data, the graphical display may be annotated with a variety of information. For example, visual depictions of traffic flows may illuminate how any given device in the network learns to reach a particular network address.

A variety of network analyses may be performed on any of these types of high-fidelity simulations using operational forwarding data, and reports may be generated based on the analyses. These reports provide network managers with valuable information on network operation. For example, reporting on forwarding tables themselves is critical to ensuring proper network behavior, e.g., that the proper default routes appear in the forwarding tables. Since a network node will drop a packet for which it has not entry in the forwarding table, maintaining default routes in each forwarding table is important to prevent excessive data loss and retransmission.

As another example, the simulations may be analyzed for conformance to organizational policies. Network managers at various organizations may set policies and rules to ensure appropriate routing guidelines. For example, they may (or may not) allow multiple next hops to a destination, to cause (or avoid) asymmetric routing. Asymmetric routing can cause packets to arrive out-of-order at the destination, resulting in unpredictable latencies, which in turn can impact the performance of certain applications. The simulations may be analyzed for conformance to such policies, and reports generated to alert network managers to policy violations. Here again, the use of operational forwarding data ensures that non-standard routing protocol behavior does not thwart organizational policies.

FIG. 1 depicts a method 10 of network analysis, according to one or more embodiments of the present invention. The method begins by providing a virtual network environment, at least part of which represents physical network features (i.e., nodes and links) (block 12). The virtual network may include network features that do not exist in a physical network, such as when simulating projected growth or other "what if" simulations to assess the impact of adding features to a network. For virtual network nodes that do correspond to physical network nodes, operational forwarding data is obtained from the physical network nodes and applied to the corresponding virtual network nodes (block 14). For one or more other virtual network nodes (which may or may not correspond to physical network nodes), forwarding data are computed by simulating the learning process of a routing protocol behavior in the virtual network environment (block 16). This hybrid approach provisions nodes in the virtual network environment with forwarding tables, preparing them for network traffic simulations.

Depending on the simulations to be performed, traffic types may be defined (e.g., bursty), QoS constraints defined and applied, and security and/or organizational policies may be applied (block 18). Traffic flows are then simulated in the virtual network environment (block 20). The results of the simulation are analyzed (block 22), and annotated graphical network representations and/or analysis reports are generated and output to the user (block 24). If more simulations are to be performed (block 26), they are defined (block 18) and the process repeats. If no more simulations are to be performed in the virtual network environment provisioned with operational forwarding data (block 26), the method ends (block 28).

Figure 2:
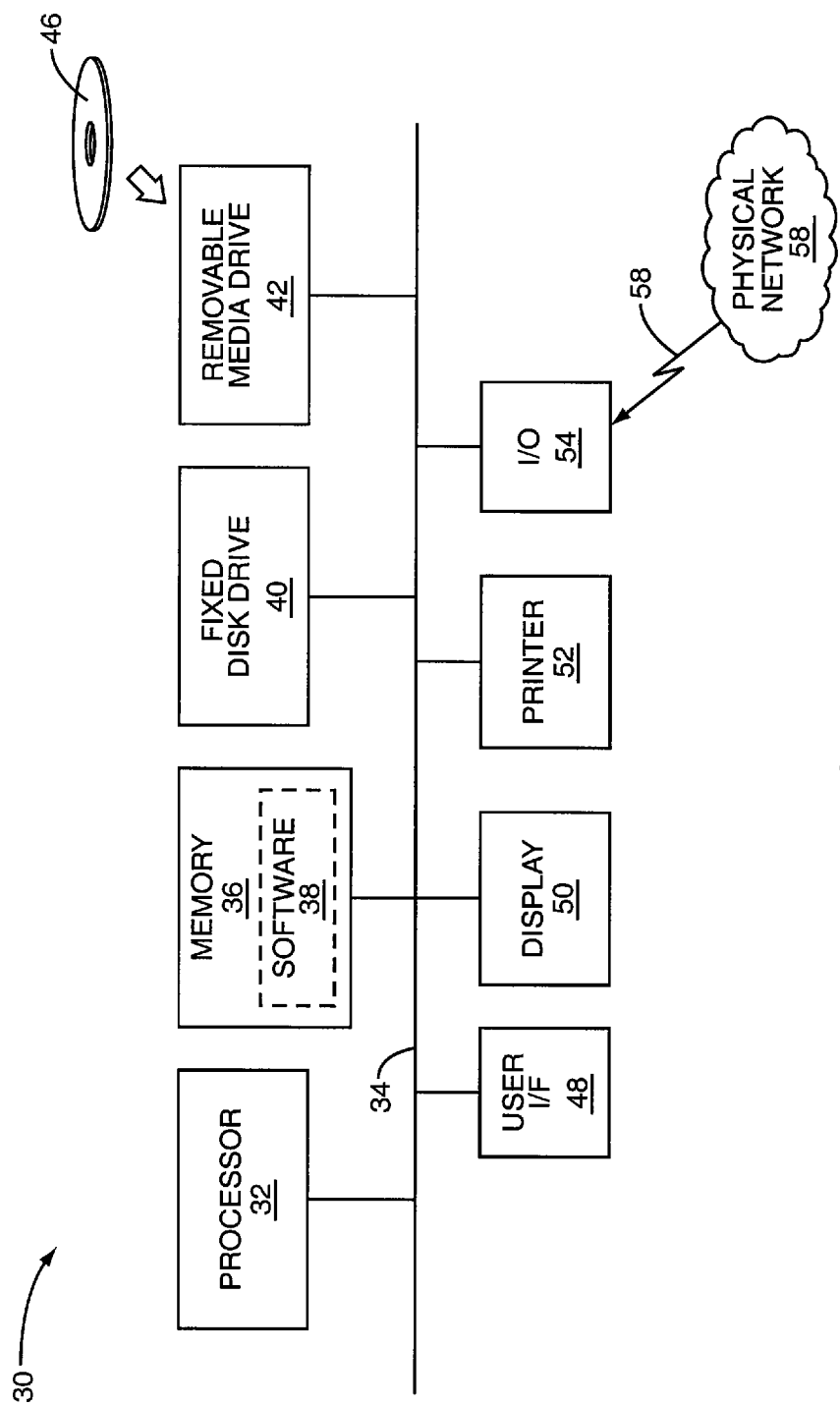
FIG. 2 is a functional block diagram of a computer executing software operative to perform network simulation using operational forwarding data.

FIG. 2 depicts a functional block diagram of a computer 30 operative to execute one or more computer programs 38 implementing the method 10. The computer 30 includes a processor 32, which may comprise a general-purpose microprocessor, a digital signal processor, or custom hardware such as an FPGA or ASIC. The processor 32 is operatively connected in data flow relationship with memory 36. The memory 36 includes, at least during its execution, software 38 operative to perform some or all of the method 10 of FIG. 1. A non-volatile copy of the software 38 may reside on a fixed disk drive 40. The software 38 may be initially loaded into the computer 30 from a computer-readable medium 46, such as a CD-ROM or DVD, via a removable media drive 42.

The computer 30 preferably includes a user interface 48, comprising a keyboard, pointing device, and the like, and a graphic display 50 operative to display a graphical representation of a virtual network environment, annotated with information derived from a high-fidelity simulation using operational forwarding data. The graphic representation and/or reports of network simulation analyses may be output to a printer 52, plotter (not shown), or other hard copy peripheral as known in the art. An input/output (I/O) interface 54 connects via a wired or wireless data channel 56 to a physical network 58. Operational forwarding data is obtained from nodes in the physical network 58, and applied by the software 38 to nodes in the virtual network environment prior to network traffic simulation.

One embodiment of the software 38 implementing the method 10 of network analysis using operational forwarding data is the OPNET SP Guru Release 12.0, available from OPNET Technologies, Inc. Although depicted as software 38 executing on a general-purpose computer 30, implementations of the method 10 are not limited to this embodiment. In general, the method may be performed by any means known in the art, including any combination of software, dedicated hardware, firmware, or the like.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of network analysis, comprising:
   providing a virtual network environment comprising virtual network nodes and simulated links between the virtual nodes, at least some of the virtual network nodes representing physical network nodes in a physical network;
   obtaining operational forwarding data from one or more of the physical network nodes, the operational forwarding data mapping datagram destination addresses to next-hop network addresses and thus specifying how datagrams are routed through the physical network;
   applying the operational forwarding data to corresponding virtual network nodes;
   for one or more virtual network nodes, computing forwarding data by simulating routing protocol behavior in the virtual network environment;
   simulating traffic flow in the virtual network environment; and
   performing traffic and capacity analysis or security analysis based on the simulated traffic flow.

2. The method of claim 1 further comprising simulating traffic flow having different Quality of Service (QoS) constraints in the virtual network environment and performing traffic and capacity analyses for the different QoS constraints.

3. The method of claim 1 further comprising simulating traffic flow having different burst characteristics in the virtual network environment and performing traffic and capacity analyses for the different burst characteristics.

4. The method of claim 1 wherein the security analysis checks for traffic that pass through the network and traffic that is blocked by security policies.

5. The method of claim 1 further comprising generating a graphical representation of the virtual network.

6. The method of claim 1 further comprising accepting a selection of a virtual node, and graphically indicating how traffic from any device in the network reaches the selected node.

7. The method of claim 1 further comprising reporting the forwarding data.

8. The method of claim 7 wherein reporting the forwarding data comprises reporting whether proper default routes appear in the forwarding tables of devices for which forwarding data is computed.

9. The method of claim 1 further comprising applying one or more organizational policies to the virtual network and reporting conformance to the policies in the simulated traffic flow.

10. The method of claim 9 wherein a policy avoids multiple next hops to a destination to avoid asymmetric routing.

11. The method of claim 1 wherein obtaining operational forwarding data from one or more physical network nodes comprises extracting a forwarding table from each physical network node by a shell command.

12. The method of claim 1 wherein obtaining operational forwarding data from one or more physical network nodes comprises issuing a command to a physical network node to export the forwarding table.

13. The method of claim 1 wherein obtaining operational forwarding data from one or more physical network nodes comprises issuing a command to a physical network node to export all forwarding data and analyzing the forwarding data to obtain a forwarding table.

14. The method of claim 1 further comprising filtering the operational forwarding data to remove data irrelevant to a simulation.

15. A non-transitory computer readable medium including one or more computer programs operative to cause a computer to perform network analysis, the computer programs operative to cause the computer to perform the steps of:
   providing a virtual network environment comprising virtual network nodes and simulated links between the virtual nodes, at least some of the virtual network nodes representing physical network nodes in a physical network;
   obtaining operational forwarding data from one or more of the physical network nodes, the operational forwarding data mapping datagram destination addresses to next-hop network addresses and thus specifying how datagrams are routed through the physical network;

applying the operational forwarding data to corresponding virtual network nodes;

for one or more virtual network nodes, computing forwarding data by simulating routing protocol behavior in the virtual network environment;

simulating traffic flow in the virtual network environment; and performing traffic and capacity analysis or security analysis based on the simulated traffic flow.

16. The computer readable medium of claim 15 wherein the computer programs are further operative to cause the computer to generate a graphical representation of the virtual network.

17. The computer readable medium of claim 15 wherein the computer programs are further operative to cause the computer to apply one or more organizational policies to the virtual network and report conformance to the policies in the simulated traffic flow.

18. The computer readable medium of claim 15 wherein the computer programs are further operative to cause the computer to simulate traffic flow having different Quality of Service (QoS) constraints in the virtual network environment and performing traffic and capacity analyses for the different QoS constraints.

19. The computer readable medium of claim 15 wherein the computer programs are further operative to cause the computer to simulate traffic flow having different burst characteristics in the virtual network environment and performing traffic and capacity analyses for the different burst characteristics.

20. The computer readable medium of claim 15 wherein the computer programs are further operative to cause the computer to accept a selection of a virtual node, and graphically indicate how traffic from any device in the network reaches the selected node.

21. The computer readable medium of claim 15 wherein the computer programs are further operative to cause the computer to report whether proper default routes appear in the forwarding tables of devices for which forwarding data is computed.

22. The computer readable medium of claim 15 wherein the computer programs are further operative to cause the computer to apply one or more organizational policies to the virtual network and report conformance to the policies in the simulated traffic flow.

23. The computer readable medium of claim 20 wherein a policy avoids multiple next hops to a destination to avoid asymmetric routing.

* * * * *